United States Patent [19]

Yoshikawa

[11] Patent Number: 5,131,501
[45] Date of Patent: Jul. 21, 1992

[54] CARRIER DEVICE FOR HEAVY LOAD

[76] Inventor: Koichi Yoshikawa, 1-10, Namiyose-cho, Atsuta-ku, Nagoya-shi, Aichi-ken, Japan

[21] Appl. No.: 727,215

[22] Filed: Jul. 9, 1991

[30] Foreign Application Priority Data

Jul. 11, 1990 [JP] Japan .................................. 2-183749

[51] Int. Cl.⁵ ............................................. B66B 9/20
[52] U.S. Cl. ..................................... 187/9 R; 187/18; 254/122
[58] Field of Search ............... 187/9 R, 9 E, 18, 8.71; 182/141; 254/2 R, 122; 414/607, 421, 608, 419, 422, 425

[56] References Cited

U.S. PATENT DOCUMENTS 4,692,084 9/1987 Persson ............................ 187/9 R
4,923,357 9/1990 Isogai ............................... 187/9 R Primary Examiner—Robert P. Olszewski
Assistant Examiner—Kenneth Noland
Attorney, Agent, or Firm—Edwin E. Greigg; Ronald E. Greigg

[57] ABSTRACT

This invention relates to improved dollies for lifting and moving heavy objects such as furniture, refrigerators, and the like. It comprises a base plate having four casters with a top plate mounted thereabove. The top plate can be elevated via a pedal-actuated lever and link mechanisms to raise the load off the floor for movements and then lower it down. The invention includes a telescopic mechanism for adjusting the top plate with respect to the base plate and a spring to bear the main weight of the load to be moved. The lifting lever can be folded out of the way for load movement where clearance is a problem.

3 Claims, 8 Drawing Sheets

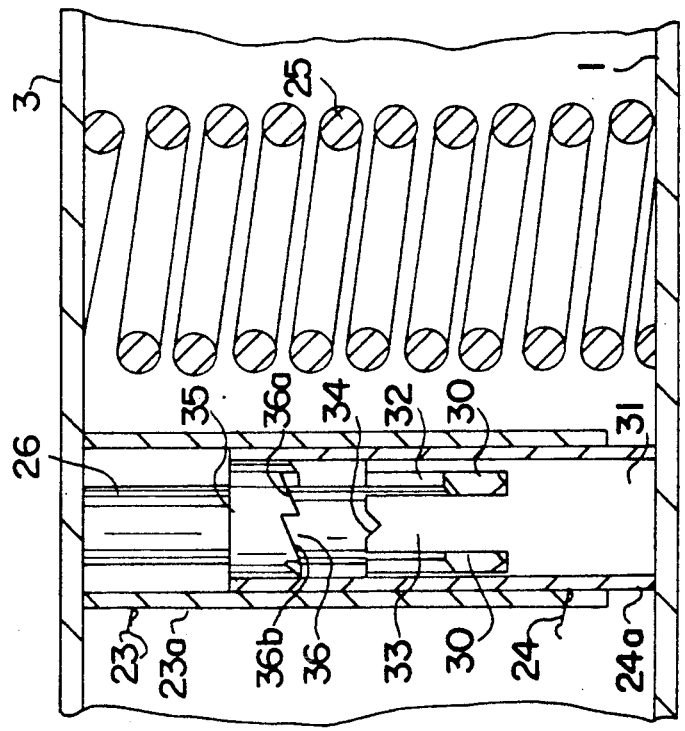
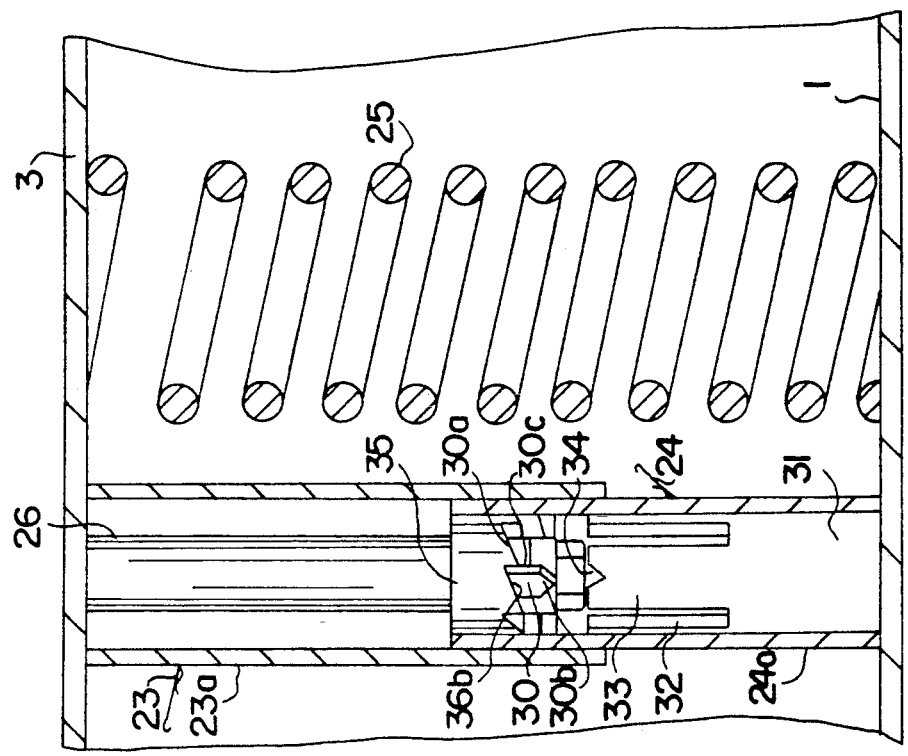

CARRIER DEVICE FOR HEAVY LOAD

BACKGROUND OF THE INVENTION

The present invention relates to a novel carrier device for carrying a heavy load, e.g. a wardrobe, a TV stand, a refrigerator, or a locker on the floor at the indoor, and a garbage container on the ground at the outdoor, to a desired location and installing it with ease.

A prior art carrier device disclosed in Japanese Patent Laid-open Publication 1-305904 (1989) has been invented for carrying a unit of furniture by the same applicant as of the present invention.

The furniture carrier device is arranged for being attached in use to each of the four corners of the lower surface of a furniture unit to be carried and comprises a stationary cylindrical member downwardly mounted to the lower surface of a top plate of small size which is horizontally attached to the bottom of the furniture to be carried and a movable cylindrical member upwardly mounted on the upper surface of a base plate of a size approximately equal to that of the top plate. The movable cylindrical is arranged for telescopic movement within the stationary cylindrical member. A coil spring is fitted onto the stationary and movable cylindrical members for tensioning between the top and base plates. Also, a roller is mounted to the lower surface of the base plate.

The furniture carrier device is small in the overall size and designed for carrying a relatively light load rather than a heavy load such as a TV stand or a refrigerator. In use, four of the furniture carrier devices are always needed as attached to the four corners of the bottom of a load to be carried. This requires troublesome preparation prior to the carrying action. Also, the furniture carrier device is provided with no locking means and will easily be affected by external force causing inadvertent lifting of the load from the floor. Such a disadvantage in the operational stability will never be eliminated.

SUMMARY OF THE INVENTION

The present invention is directed towards a carrier device for heavy load which provides non of the foregoing drawbacks and can be used in both the indoor and the outdoor. The carrier device for heavy load according to the present invention comprises a base plate extending horizontally, castors mounted to both the front and rear of the lower surface of the base plate for running on the floor, a top plate mounted above the base plate for supporting a load to be carried in a horizontal state, main link mechanisms arranged for coupling the base plate to the top plate, sub link mechanisms arranged for co-movement with the main link mechanisms, a lever having a pedal pivotably mounted the distal end thereof and horizontally coupled to sub link mechanisms for pivotal movement so that when the pedal is pressed down, the top plate can be lifted upward, a stopper mounted to the front end of the lower surface of the top plate to extend horizontally towards the front so that the pedal when not in use can be accommodated between the stopper and the top plate which is in the lifted-down state, a movable cylindrical member downwardly mounted to the lower surface of the top plate, a stationary cylindrical member upwardly mounted on the upper surface of the base plate so that the movable cylindrical member can perform telescopic movements on the stationary cylindrical member, and means for controlling the engagement between the movable cylindrical member and the stationary cylindrical member during their telescopic action to a given depth and a greater depth alternately so that the top plate can remain spaced upward from the floor when is at the given depth and be seated directly on the floor when at the greater depth.

One single unit of the carrier device of the present invention is used for carrying a heavy load, e.g. a TV stand, which has a lower surface of approximately square shape and is short in the overall length. A couple of the carrier devices may be attached to the front and rear ends of the lower surface of a heavier load respectively, e.g. a book case or outdoor garbage container, which has a lower surface of approximately rectangular shape and is not short in the overall length.

When the load sits directly on the floor, the movable cylindrical member remains pressed down into the innermost of the stationary cylindrical member by the weight of the load thus maintaining the top plate at the lower position.

When the pedal is pulled outward from the side of the carrier device and pressed down for starting carrying action of the load, its action triggers via the sub and main link mechanisms the upward movement of the top plate. Accordingly, the movable cylindrical member is lifted out from the stationary cylindrical member and then, held at a not-so-deep position in the same so that the top plate stays a bit high and the load on the top plate remains spaced upward from the floor. As the result, the carrier device can freely be moved on the castors.

After the load is carried to a desired location, the downward movement of the pedal causes the movable cylindrical member to move once again into the innermost of the stationary cylindrical member thus lowering the load down to the floor. The carrying action will be completed when the pedal is folded down and inserted back into the accommodating position in the carrier device.

BRIEF DESCRIPTION OF THE DRAWINGS

The accompanying drawings illustrate one preferred embodiment of the present invention in the form of a carrier device, in which.

DETAILED DESCRIPTION OF THE PREFERRED EMBODIMENT

Figure 1:
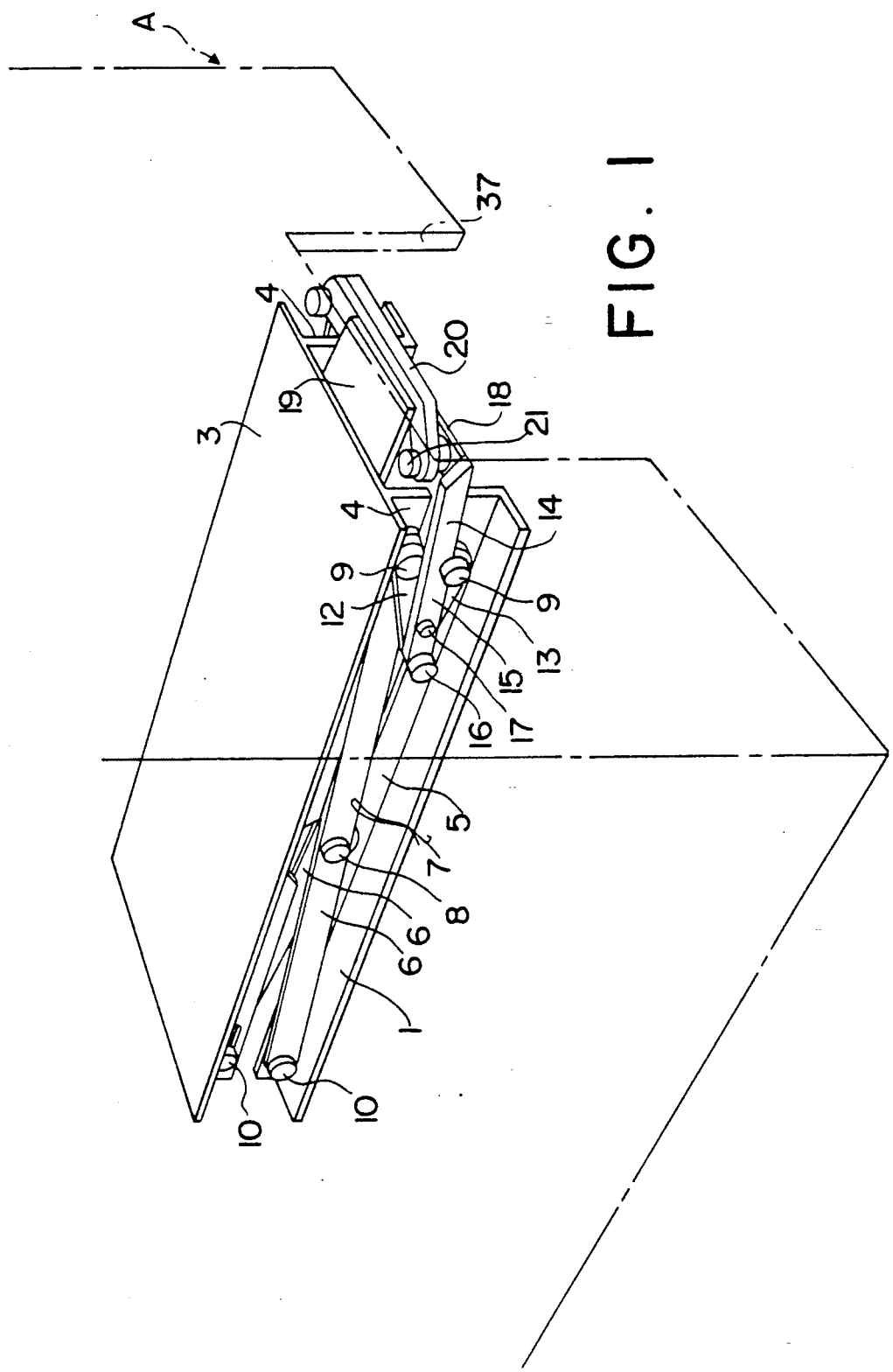
FIG. 1 is a perspective view of the carrier device with a TV stand being placed on the floor.

One preferred embodiment of the present invention will be described in the form of a carrier device for heavy load referring to the accompanying drawings.

As shown, there is provided a base plate 1 of rectangular shape extending horizontally and having at the front and the rear step portions 1a and 1b respectively.

A couple of two-wheel castors 2, 2 are mounted to the front and rear step portions 2, 2 respectively so that the carrier device can run on the floor. A top plate 3 is mounted above the base plate 3 for supporting the bottom of a TV stand A in carrying action. The top plate 3 has two lengthwisely extending side plates 4, 4 downwardly mounted thereto inside from the side ends while the base plate 1 has two lengthwisely extending side plates 5, 5 upwardly mounted thereto at the same so that the side plates 4, 4 can be opposite to the side plates 5, 5. Each pair of the side plates 4 and 5 are linked with each other by a main link mechanism 7 of one side which comprises a couple of support rods 6, 6 arranged in cross relationship for upward and downward movement of the top plate 3. More particularly, the two crossed support rods 6, 6 are pivotably coupled at the center to each other by a pivot pin 8 and at front end to the side plates 4 and 5 respectively by pins 9, 9. The support rods 6, 6 have at the rear end two pins 10, 10 fixedly mounted thereto respectively and movably fitted into lengthwisely extending slots 11, 11 provided in their respective side plates 4 and 5. The two, upper and lower, pins 9, 9 in the front are coupled to connecting rods 12 and 13 respectively which are in turn linked by a pin 16 to a driver rod 14. More specifically, the connecting rods 12 and 13 and the driver rod 14 constitute in combination a sub-link mechanism 15 of one side, in which the connecting rods 12 and 13 are pivoted on the pin 16 together with the driver rod 14 and can also move about their respective pins 9, 9. The connecting rod 13 has a pin 17 mounted thereon close to the pin 16 for fixed coupling with the driver rod 14. The two, left and right, driver rods 14, 14 are coupled at front end to each other by a traverse bar 18 extending transversely. A lever 20 having at distal end a pedal 19 pivotably mounted thereon is mounted by a pin 21 on an off-center portion of the traverse bar 18 so that it can turn about the pin 21. When not in use, the pedal 19 and the lever 20 are horizontally folded down to be accommodated beneath the top plate 3. In more detail, the pedal 19 is inserted for lock on into between the top plate 3 and a stopper 22 which is mounted to the bottom surface of the top plate 3 and extends horizontally to the front while the top plate 3 remains lifted down.

Also, a movable cylindrical member 23 is downwardly mounted to the center bottom surface of the top plate 3 for telescopic movement on a stationary cylindrical member 24 which is fixedly mounted upright on the center upper surface of the base plate 1. There are a pair of compression coil springs 25, 25 fixedly mounted between the base plate 1 and the top plate 3 and spaced a given distance from the movable and stationary cylindrical members 23 and 25 to the front and the rear respectively.

The movable cylindrical member 23 accommodates a support shaft 26 which is fixedly mounted at uppermost end to the bottom surface of the top plate 3 so that it can downwardly extend throughout the inside space 23a of the cylindrical member 23. The support shaft 26 has a small diameter region 26a provided in the distal lowermost end thereof for accepting a collar 27 in fitting engagement. More specifically, the collar 27 is rotatably retained by a nut 29 screwed onto a thread 28 arranged in the distal end of the small diameter portion 26a. The collar 27 has a plurality of fins 30 mounted at equal intervals to the outer circumferential surface thereof. Each fin 30 has two, left and right, vertically extending side walls and two, upper and lower, walls thereof in which the upper wall is sloped down from the right to the left thus forming a projection 30a of single-blade shape and the lower wall is pointed at the center and divided into two sloping sides thus forming an inverted V-shaped projection 30b.

The stationary cylindrical member 24 has a receptor member 31 fixedly mounted therein to extend the inside space 24a thereof. The receptor member 31 is arranged into a cylindrical shape having a circumferential wall which is provided with vertically extending slots 32 of a given depth for accepting the fins 30 respectively so that the fins 30 when moved in can slide therealong upward and downward. Between the two adjacent deep slots 32, 32 forms each projection 33 of the receptor member 30 which has at uppermost end a V-shaped recess 34 for sustaining the lower projection 30b of each fin 30.

Also, a guide ring 35 is mounted to the uppermost end of the inner wall of the stationary cylindrical member 24 thus downwardly extending in the inner space 24a of the same. The guide ring 35 is adapted for guiding the vertical movement of the support shaft 26 and has a lower end thereof arranged in sawtooth shape thus providing a plurality of engaging recesses 36 therein for engagement with the upper, single-blade shaped projections 30a of the fins 30. The engaging recesses 36 are aligned to come opposite to the deep slots 32 and the V-shaped recesses 34 of the receptor member 31 alternately. In particular, when the fins 30 are engaged with the deep slots 32 or V-shaped recesses 34, the vertical wall 36a of each engaging recess 36 comes a bit on the left of the right wall 30c of the corresponding fin 30. Hence, for engagement of the fin 30 with its corresponding engaging recess 36, the single-blade shaped projection 30a of the fin 30 rightwardly moves along the sloping wall 36b of the recess 36 to the deepest point of the same. This movement allows the fins 30 to rotate only in one (rightward) direction. Accordingly, the receptor member 31 and the guide ring 35 are spaced from each other a given distance for permitting free rotation of the collar 27.

The total yielding force of the two compression coil springs 25, 25 are determined to a rate a bit less than the load of the TV stand A.

Figure 2:
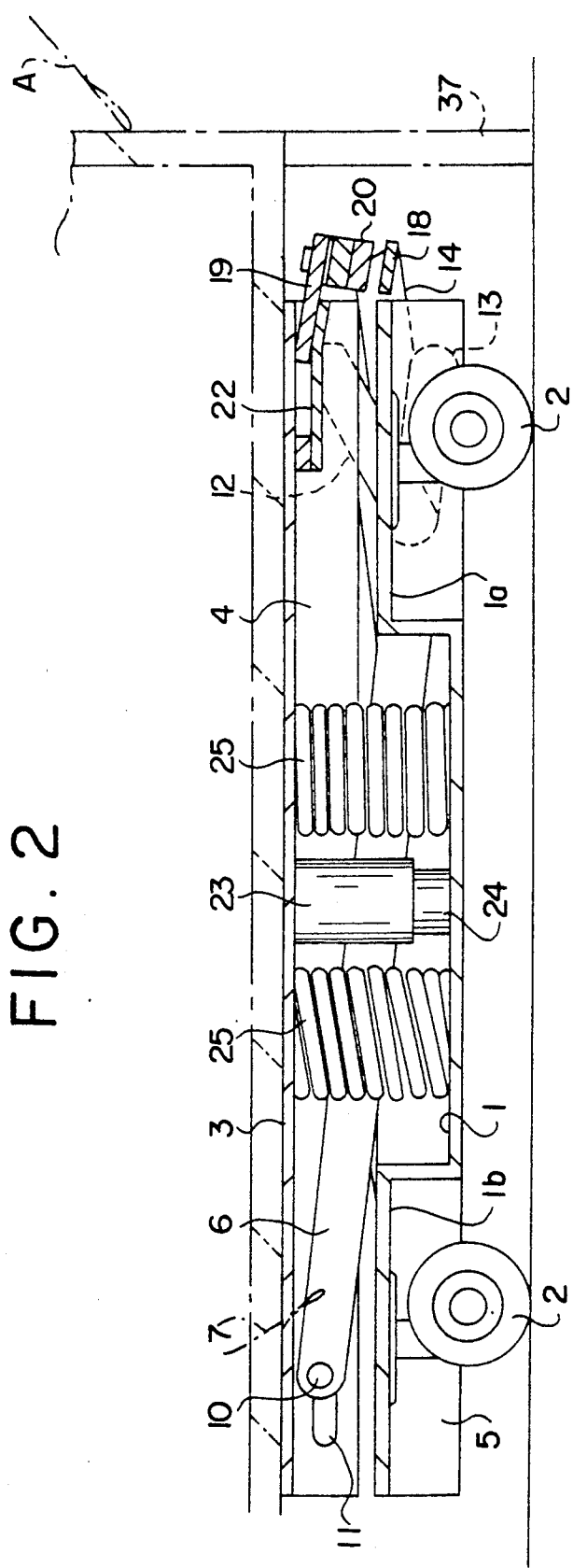
FIG. 2 is a cross sectional side view of the same.
Figure 8D:
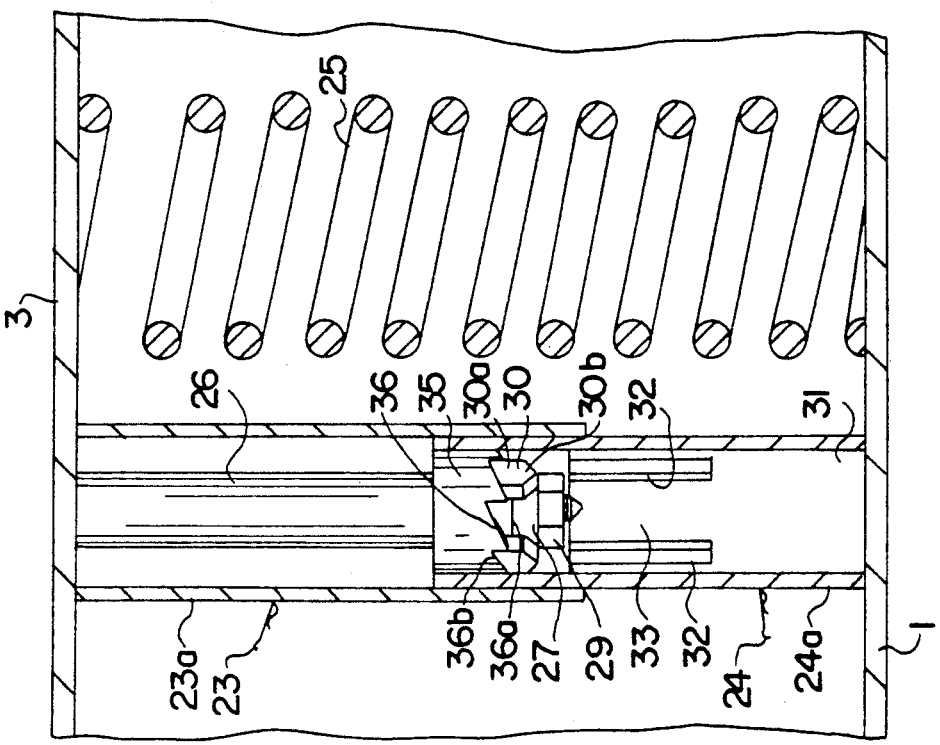
FIGS. 8-a, 8-b, 8-c, and 8-d are cross sectional views explaining the operation of the carrier device.
Figure 8C:
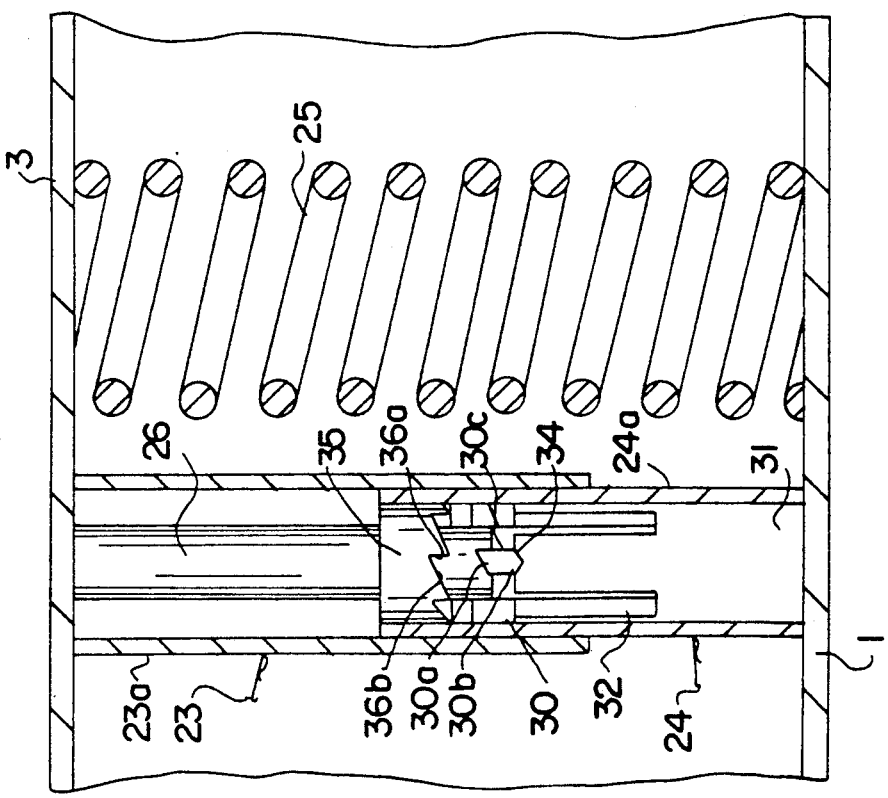

The use of the carrier device of the present invention having the foregoing arrangement will now be explained. When the TV stand A is loaded onto the carrier device shown in FIG. 1, the compression coil springs 25, 25 are pressed down by the weight of the TV stand A as shown in FIG. 2. Hence, the fins 30 of the collar 27 move into the deep slots 32 of the receptor member 31 as shown in FIG. 8-a so that the TV stand A remains sitting on the floor in no carryable state. At the time, the pedal 19 stays between the top plate 3 and the stopper 22 locking the movement of both the left and right sub-link mechanisms 15, 15 and thus, the upward movement of the top plate 3 is securely restricted.

Figure 3:
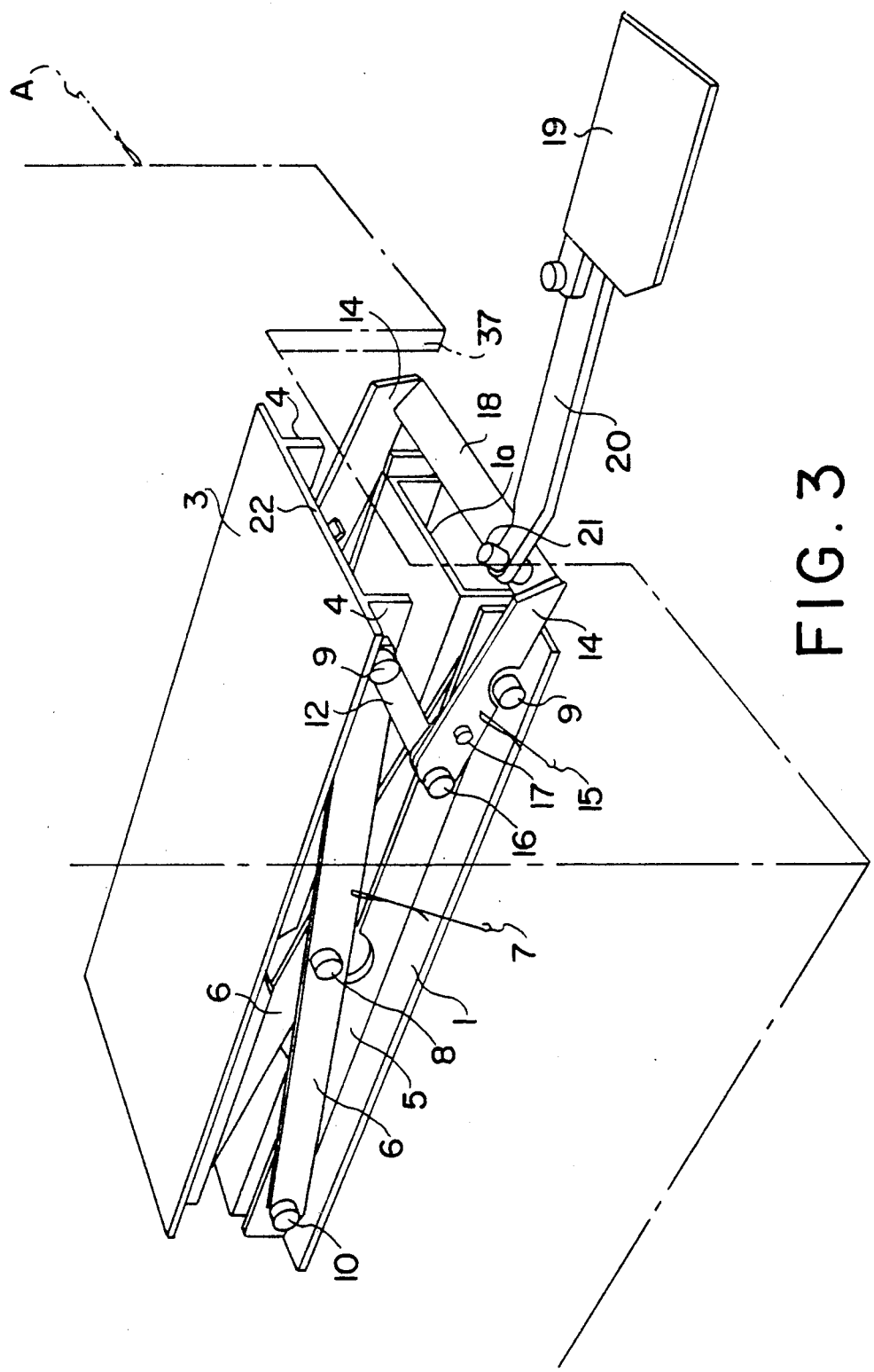
FIG. 3 is a perspective view of the carrier device with the TV stand being lifted up from the floor.
Figure 4:
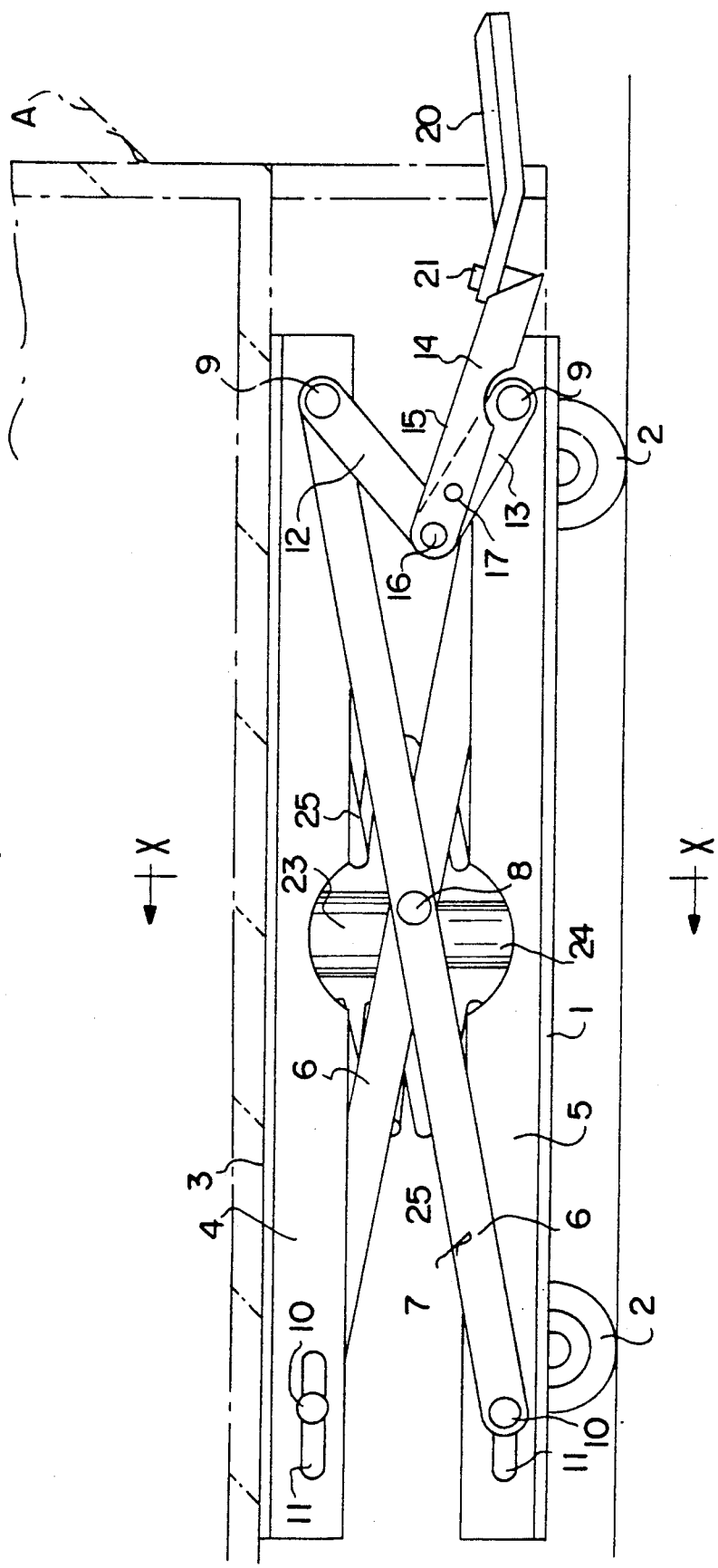
FIG. 4 is a side view of the same.
Figure 5:
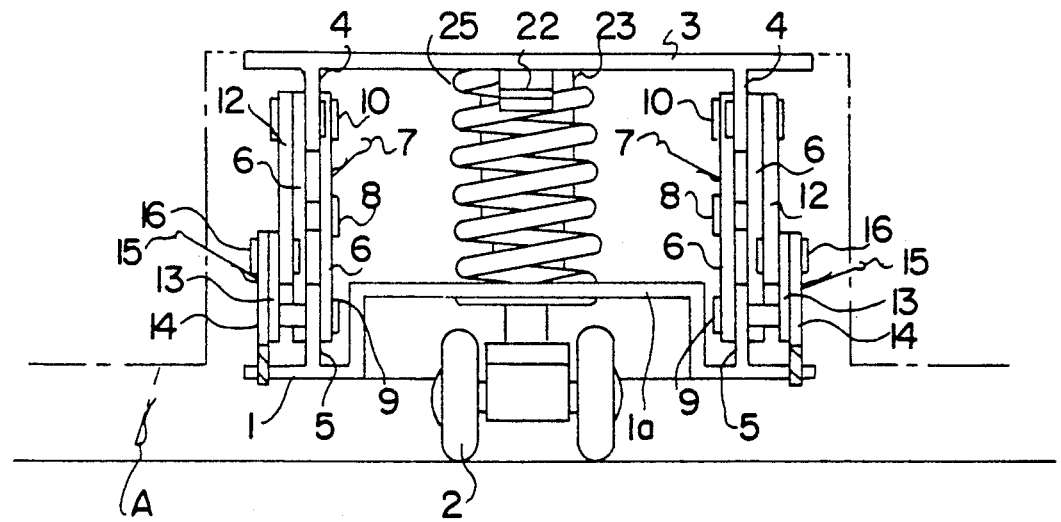
FIG. 5 is a right side view of the same.
Figure 6:
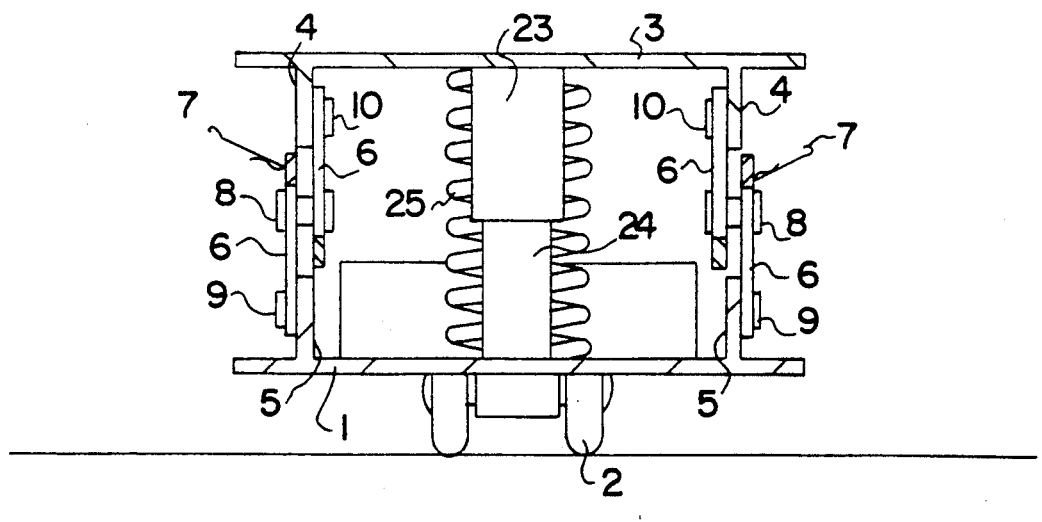
FIG. 6 is a cross sectional view taken along the line X—X of FIG. 4.
Figure 7:
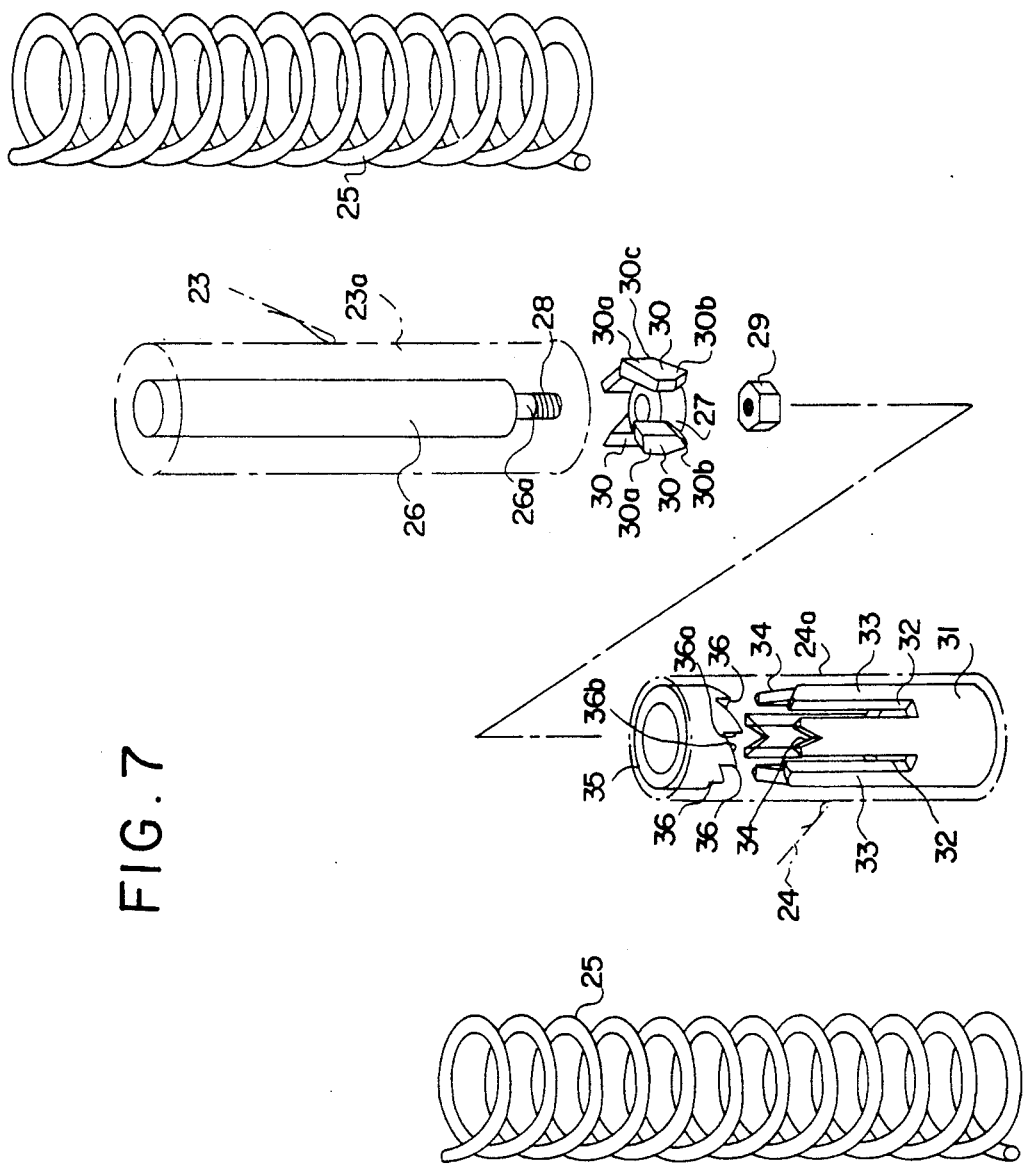
FIG. 7 is an exploded perspective view showing a movable cylindrical member, a stationary cylindrical member, and compression coil springs.

For carrying the TV stand A, the pedal 19 is pulled out through an opening 37 provided in the lower side of the TV stand A as shown in FIG. 3 and pressed down. The downward action of the petal 19 triggers the movement of the sub-link mechanisms 15, 15 which in turn and actuates the main link mechanisms 7, 7 to lift up the top plate 3 with the help of the yielding force of the coil springs 25, 25. Simultaneously, the fins 30 of the collar 27 engaged with the deep slots 32 of the receptor member 31 are moved upward and rotate rightward with their single-blade shaped projections 30a being slid directly along the corresponding sloping walls 36b of the engaging recesses 36 of the guide ring 35 prior to being fitted into the deepest points of the engaging recesses 36 for engagement as shown in FIG. 8-b.

When the pedal 19 is released, the top plate 3 is lowered by the weight of the TV stand A. As the inverted V-shaped projections 30b of the fins 30 now come into engagement with the V-shaped recesses 34 of the projections 33 of the receptor member 31, the TV stand A remains elevated up from the floor as shown in FIG. 8-c. Accordingly, the castors 2, 2 become movable and the TV stand A will be carried to a desired location.

When the TV stand A comes to the desired location, the pedal 19 is lightly pressed down. Then, the fins 30 of the collar 27 come into engagement with the engaging recesses 36 of the guide ring 35, as shown in FIG. 8-d, after their upper projections 30a are slid directly on the sloping walls 36b of the engaging recesses 36 for rightward rotation. The releasing of the pedal 19 causes the coil springs 25, 25 to be compressed by the weight of the TV stand A and thus, the fins 30 move downward into the deep slots 32 of the receptor member 31 for seating the TV stand A on the floor as shown in FIG. 8-a.

Although the embodiment is described in the case of carrying the TV stand A, any heavy load which is small in the bottom area and short in the length like a TV stand will successfully be lifted and carried by one single unit of the carrier device in a not tilted but leveled condition. Also, the carrier device of the present invention can carry bulky indoor appliances including a refrigerator and a music organ and outdoor articles such as garbage containers. If a load to be carried is large in the bottom area or long in the overall length, a couple of the carrier devices of the present invention will be used for supporting the two ends respectively.

The compression coil springs mounted between the top and base plates are intended for ease of lifting operation and without them, the lifting action will be executed by means of the lever movement with the pedal. In this case, unwanted elevating of the top plate triggered by exterior force or unnecessary lifting of a load up from the floor will be avoided. If any, the compressing coil springs may be replaced with other urging means including as leaf springs.

What is claimed is:

1. A carrier device for movement of a heavy load on a floor comprising:

a base plate extending horizontally, said base plate including a front and a rear and upper and lower surfaces;

castors mounted to both the front and rear of the lower surface of the base plate for running on the floor;

a top plate mounted above the upper surface of the base plate for supporting a load to be carried in a horizontal state, said top plate having a front end and an upper and lower surface;

main link mechanisms arranged for coupling the base plate to the top plate;

sub link mechanisms connected with said main link mechanisms and arranged for co-movement with the man link mechanisms;

a level having a pedal pivotably mounted on the distal end thereof and horizontally coupled to said sub link mechanisms for pivotal movement so that when the pedal is pressed down, the top plate can be lifted upward via said main link mechanisms;

a stopper mounted to the front end of the lower surface of the top plate to extend horizontally towards the front so that the pedal when not in use can be accommodated between the stopper and the lower surface of the top plate which is in the lifted-down state;

a movable cylindrical member downwardly mounted to the lower surface of the top plate;

a stationary cylindrical member upwardly mounted on the upper surface of the base plate so that the movable cylindrical member can perform telescopic movements on the stationary cylindrical member; and means for controlling the engagement between the movable cylindrical member and the stationary cylindrical member during their telescopic action to a given depth and a greater depth alternately so that the top plate can remain spaced upward from the floor when it is at the given depth and be seated directly on the floor when at the greater depth.

2. A carrier device as set forth in claim 1, in which: said main link mechanisms include a pair of crossed supports on opposite sides of said base plate and said top plate.

3. A carrier device as set forth in claim 2, in which: said sub link mechanisms include connecting rods (12, 13) which are linked to one end of said crossed supports and to a drum rod (14).

* * * * *